United States Patent
Niebauer et al.

(10) Patent No.: US 9,500,766 B2
(45) Date of Patent: Nov. 22, 2016

(54) INTERFEROMETRIC GRAVIMETER APPARATUS AND METHOD

(71) Applicant: Micro-g LaCoste, Inc., Lafayette, CO (US)

(72) Inventors: Timothy M. Niebauer, Boulder, CO (US); Fred J. Klopping, Longmont, CO (US); Ryan M. Billson, Loveland, CO (US)

(73) Assignee: Micro-g LaCoste, Inc., Lafayette, CO (US)

( * ) Notice: Subject to any disclaimer, the term of this patent is extended or adjusted under 35 U.S.C. 154(b) by 229 days.

(21) Appl. No.: 14/327,809

(22) Filed: Jul. 10, 2014

(65) Prior Publication Data
US 2014/0318239 A1    Oct. 30, 2014

Related U.S. Application Data

(63) Continuation-in-part of application No. 13/558,138, filed on Jul. 25, 2012, now Pat. No. 8,978,465.

(51) Int. Cl.
*G01V 7/14* (2006.01)
*G01V 7/16* (2006.01)
(Continued)

(52) U.S. Cl.
CPC ............ *G01V 7/04* (2013.01); *G01B 9/02016* (2013.01); *G01B 9/02021* (2013.01); *G01B 9/02045* (2013.01); *G01V 7/14* (2013.01); *G01V 7/16* (2013.01)

(58) Field of Classification Search
CPC ............ G01V 7/14; G01V 7/16; G01V 7/04; G01B 9/02045; G01B 9/02016; G01B 9/02021

USPC ............................................ 73/382 R, 382 G
See application file for complete search history.

(56) References Cited

U.S. PATENT DOCUMENTS 3,429,184 A * 2/1969 Russell .................... G01V 7/04
                                                         359/529
3,688,584 A    9/1972 Stone et al.
(Continued)

FOREIGN PATENT DOCUMENTS

CN        102323624 A    1/2012
EP         2348338 A1    7/2011
(Continued)

OTHER PUBLICATIONS

PCT International Search Report with attached Written Opinion of the International Searching Authority for International Application No. PCT/US2013/050800, dated Dec. 10, 2013, 13 pages.
(Continued)

*Primary Examiner* — Helen Kwok
(74) *Attorney, Agent, or Firm* — John R. Ley

(57) ABSTRACT

A gravity value is measured using two light beams which each reflect from both a freefall test mass and a stationary reference test mass which is inertially supported by a long period isolation device. The optical path lengths of the light beams change equally and oppositely in response to gravity and equally in response to disturbances, resulting in cancellation of the undesirable effects of the disturbances by common mode rejection and in a desirable increase in the number of gravity induced measurement fringes, when the two light beams are combined interferometrically.

22 Claims, 6 Drawing Sheets

(51) Int. Cl.
*G01B 9/02* (2006.01)
*G01V 7/04* (2006.01)

(56) References Cited

U.S. PATENT DOCUMENTS

| | | | |
|---|---|---|---|
| 3,693,451 A | 9/1972 | Dunlap et al. | |
| 3,704,626 A | 12/1972 | Stone | |
| 3,727,462 A | 4/1973 | Stone et al. | |
| 3,865,467 A * | 2/1975 | Von Thuna | G01V 7/14 359/529 |
| 5,351,122 A * | 9/1994 | Niebauer | G01V 7/14 356/28.5 |
| 5,461,914 A | 10/1995 | Zumberge et al. | |
| 5,892,151 A | 4/1999 | Niebauer et al. | |
| 6,082,194 A | 7/2000 | Gladwin | |
| 6,298,722 B1 | 10/2001 | Faller et al. | |
| 6,325,172 B1 | 12/2001 | Langridge et al. | |
| 6,671,057 B2 | 12/2003 | Orban | |
| 7,469,585 B2 | 12/2008 | Meyer | |
| 8,286,485 B2 | 10/2012 | Benischek et al. | |
| 8,931,341 B2 * | 1/2015 | Klopping | G01V 7/14 73/382 G |
| 8,978,465 B2 * | 3/2015 | Klopping | G01V 7/14 73/382 G |
| 2003/0081218 A1 | 5/2003 | Orban | |
| 2008/0015803 A1 * | 1/2008 | Niebauer | G01V 13/00 702/85 |
| 2008/0034855 A1 | 2/2008 | Peeters | |
| 2009/0219546 A1 | 9/2009 | Benischek | |
| 2011/0046913 A1 * | 2/2011 | Hilby | G01V 7/14 702/141 |
| 2013/0205894 A1 | 8/2013 | Rothleitner | |
| 2014/0026654 A1 | 1/2014 | Klopping et al. | |
| 2014/0026655 A1 * | 1/2014 | Klopping | G01V 7/14 73/382 R |

FOREIGN PATENT DOCUMENTS

| | | |
|---|---|---|
| FR | 2089057 A5 | 1/1972 |
| WO | 2011/086020 A1 | 7/2011 |

OTHER PUBLICATIONS

PCT International Search Report with attached Written Opinion of the International Searching Authority for International Application No. PCT/US2013/050819, dated Dec. 3, 2013, 14 pages.

Christian Rothleitner, "Ultra-high Precision, Absolute, Earth Gravity Measurements," dissertation, 2008, pp. 1-160, University Erlangen-Nuremberg, Berlin, Germany.

C. Rothleitner et al., "A method for adjusting the centre of mass of a freely falling body in absolute gravimetry," 2007, pp. 234-241, IOP Publishing, Metrologia, Bristol, Great Britain.

A. Vitouchkine et al., "Short Communication—A direct and sensitive method for positioning the centre of mass of a dropping object at the optical centre of the enclosed corner cube in ballistic absolute gravimeters," 2004, pp. L19-L21, Institute of Physics Publishing, Metrologia, Bristol, Great Britain.

T. Niebauer et al., "A new generation of absolute gravimeters," 1995, pp. 159-180, Metrologia.

Dr. Peter G. Nelson, "Supporting Active Electro-Pneumatic Vibration Isolation Systems on Platforms Supported by STACIS 'Hard-Mount' Piezoelectric Isolation Systems," Apr. 2002, 5 pages, Technical Manufacturing Corporation, Peabody, Massachusetts.

C. Collette et al., "Active vibration isolation of high precision machines," Publication, Jan. 21, 2011, 6 pages, European Coordination for Accelerator Research and Development (EuCARD), European Organization for Nuclear Research CH-1211, Geneva 23, Switzerland.

Niebauer et al., Micro-g Solutions, Inc. Operator's Manual, FG5 Absolute Gravimeter, Copyright 1996, Design: Components and Function (pp. 2-12 and 2-13), 4 pages, Erie, Colorado.

* cited by examiner

INTERFEROMETRIC GRAVIMETER APPARATUS AND METHOD

CROSS REFERENCE TO RELATED APPLICATION

This is a continuation-in-part of the invention described in U.S. patent application Ser. No. 13/558,138, filed Jul. 25, 2012, for an Interferometric Gradiometer Apparatus and Method, made by the inventors hereof and assigned to the assignee hereof. The subject matter of this prior patent application is incorporated herein by this reference.

FIELD OF THE INVENTION

This invention relates to measuring gravity, and more specifically, to a new and improved gravimeter and method which measures a value of gravity using multiple light beams which interact with both a freefall test mass and a reference test mass while substantially removing or canceling naturally occurring long period seismic disturbances and short period disturbances caused by man or ambient environmental conditions, thereby improving the accuracy of the gravity measurement.

BACKGROUND OF THE INVENTION

Gravity is the force of inherent natural attraction between two massive bodies. The magnitude of the gravitational force is directly related to the mass of the bodies and is inversely related to the square of the distance between centers of mass of the two attracted bodies.

Gravity is measured as acceleration, g, usually as a vertical vector component. The freefall acceleration, g, of an object near the surface of the earth is given to a first approximation by the gravitational attraction of a point with the mass of the entire earth, $M_e$, located at the center of the earth, a distance, $R_e$, from the surface of the earth. This nominal gravity value, $g=G \times M_e/R_e^2$, is about 9.8 m/s². Thus, the freefall acceleration due to gravity near the earth's surface of an object having a small mass compared to the mass of the earth is about 9.8 m/s². The common unit of measurement for gravity is the "Galileo" (Gal), which is a unit of acceleration defined as 1 cm/s². One Gal generally approximates 1/1000 ($10^{-3}$) of the force of gravity at the earth's surface. An instrument used to measure gravity is called a "gravimeter."

The most accurate gravimeters are absolute gravimeters. Interferometric absolute gravimeters usually use a freefall test mass and a laser or single-frequency light beam which reflects from the freefalling test mass. The reflected light beam is combined with a reference light beam to develop interference fringes. Interference fringes are instances where the amplitude or intensity of the reflected and reference light beams add together to create increased intensity, separated by instances where the two beams cancel or create diminished intensity.

Fringes occur on a periodic basis depending upon the change in the optical path length of the reflected beam relative to the optical path length of the reference beam. One fringe occurs whenever the optical path difference between the reflected and reference beams changes by the wavelength of the light of the two beams. The path length of the reflected beam changes as it is reflected from the freefalling test mass, and that change in path length is directly related to the acceleration of the test mass caused by gravity. The fringes taken together as a set comprise a record of the distance that the freely falling body moves, and that distance is directly related to the gravity or acceleration of the freefall test mass. The use of optical fringe interferometry to measure gravity is well known. U.S. Pat. No. 5,351,122 describes an example of such a gravimeter.

A gravimeter is subject to naturally-occurring and man-made disturbances, such as seismic noise, mechanical vibrations and other physical perturbations. The disturbances cause minute changes in the path lengths of the reflected and reference light beams in an interferometric gravimeter. When the reflected and reference light beams are combined, the resulting fringes include information generated by the disturbances and not by gravity. Consequently, the accuracy of the gravity measurement suffers due to the errors introduced by the disturbances.

Natural seismic noise is a naturally-occurring physical disturbance which is particularly troublesome in interferometric gravimeters. Natural seismic noise is the natural up-and-down movement of the earth surface at an oscillatory period of about 3 to 6 seconds. The frequency of seismic noise is comparable to the typical frequency of ocean waves. Natural seismic noise typically creates vertical movement of about one micron (1μ) at the earth surface. While a one micron vertical movement of the earth surface cannot be sensed humanly, it is a very significant disturbance in an interferometric gravimeter. Typically in an interferometric gravimeter, fringes occur when the reflected and reference beam path lengths differ from one another in increments of one nanometer (1 nm). Natural seismic noise of about one micron is 1000 times greater than the typical path length difference which creates a fringe. Consequently, natural seismic noise has the potential to obscure the gravity measurement data with irrelevant and distracting fringes.

One technique used to eliminate or substantially reduce the effect of natural seismic noise in an interferometric gravimeter is to include a stabilized reflector in the path of the reflected light beam. The stabilized reflector is isolated from the effects of seismic noise by suspending it from a conventional long period isolation device. In essence, the long period isolation device functions as a spring which has a natural oscillatory period which is many times longer than that natural oscillatory period of seismic noise. With a long natural oscillatory period, the long period isolation device inertially stabilizes and isolates the stabilized reflector by disconnecting or decoupling it from the effects of seismic noise. In this manner, the reflected light beam becomes substantially unaffected by seismic noise. The reflected light beam interacts with the freefalling test mass and is also substantially unaffected by seismic noise because the freefall test mass is disconnected or decoupled from the earth while in freefall. When the reference and reflected light beams are combined, some of the effects of natural seismic noise are eliminated to achieve a more accurate gravity measurement. This technique is described in U.S. Pat. No. 5,351,122, and in "A New Generation of Absolute Gravimeters," *Metrologia*, vol. 32, pp. 159-180, 1995.

Short period disturbances are difficult to suppress in an interferometric gravimeter. Short period disturbances, such as mechanical vibrations and other types of physical perturbations, are typically man-made and result from vehicles moving over the earth surface, or people or animals walking or running on the earth surface, or the operation of heavy machinery. Short period disturbances also arise from natural ambient environmental conditions, such as wind gusts which impact the gravimeter when set up in an outdoor environment or wind guests which impact trees and other nearby structures which transfer the impact forces as movement to the earth surface.

The long period isolation device provides theoretical inertial stabilization and isolation of the stabilized reflector against short period external disturbances. However, the stabilization and isolation may not be complete from a practical standpoint. A conventional long period isolation device includes electronic components and a feedback control mechanism which are intended to respond principally to long period disturbances. Consequently, the control loop response of the long period isolation device may not be fully effective in suppressing and isolating the stabilized reflector from some types of short period disturbances.

Short period disturbances have the potential to significantly impact the freefall test mass during freefall. Even though the freefall test mass is mechanically decoupled from the gravimeter and the earth during freefall, short period disturbances may impact the test mass at the instant when it is released for freefall, thereby rotating the test mass while in freefall. Rotation of the freefall test mass has the effect of changing the path length of the reflected beam path relative to the length of the reference beam path. The change in path length results from the short period disturbance which induce rotation of the freefall test mass, not from the effect of gravity. Consequently, short period disturbances which rotate the freefall test mass during freefall create anomalous fringes which introduce errors into the gravity measurement.

The inertial isolation functionality from the long period isolation device usually prevents the stabilized reflector from rotating in a similar manner or to the same degree as the freefall test mass rotates. In those circumstances where the long period isolation device is incapable of fully isolating the stabilized reflector from short period disturbances, the movement or rotation of the stabilized reflector will typically be different in extent or degree compared to that of the freefall test mass.

SUMMARY OF THE INVENTION

This invention eliminates or substantially reduces the adverse effects of both long period and short period disturbances in a light beam interferometric gravimeter, thereby achieving greater accuracy in the measurement of gravity. The adverse effects of long period disturbances are eliminated by inertially stabilizing and isolating a stabilized reflector with a long period isolation device. The adverse effects of short period disturbances are eliminated by optically directing both the reference and reflected light beams on both a freefall test mass and the stabilized reflector. Both the reflected and reference beams are affected equally by the short period disturbances, and those adverse effects are canceled by common mode rejection when the reflected and reference light beams are combined to develop fringes. The adverse effect of any long period disturbance which is not fully suppressed by the long period isolation device is also canceled in the same manner. A significantly enhanced signal-to-noise ratio is achieved, making the gravity measurements more accurate and easier to accomplish. These and other features and benefits are achieved by various aspects of the invention, which are generally summarized below.

One aspect of the invention involves a gravimeter for measuring a value of gravity. The gravimeter comprises a first test mass which is released for freefall solely under the influence of gravity, and a second test mass connected to a long period isolation device which inertially stabilizes and isolates the second mass against long period disturbances. An arrangement of optical elements conduct first and second light beams, which have the same initial frequency and a predetermined initial phase relationship, through first and second different beam arms. The first beam arm directs the first light beam to impinge upon and reflect from both test masses during freefall of the first test mass, and the second beam arm directs the second light beam to impinge upon and reflect from both test masses during freefall of the first test mass. An interferometric combination of the first and second light beams delivered from the first and second beam arms is used in determining the value of gravity.

Another aspect of the invention involves a method of measuring a value of gravity. The method comprises freefalling a first test mass solely under the influence of gravity, inertially stabilizing and isolating a second test mass from long period disturbances, directing a first light beam having a predetermined frequency into a first beam arm to impinge upon and reflect from both first and second test masses during freefall of the first test mass, directing a second light beam having the same predetermined frequency and a fixed phase relationship with the first light beam into a second beam arm to impinge upon and reflect from both first and second test masses during freefall of the first test mass, creating fringes by interferometrically combining the first and second light beams from the first and second beam arms after the first and second light beams have impinged upon and reflected from both test masses during freefall of the first test mass, and determining the value of gravity by use of the fringes.

The first and second beam arms are oriented to create equal and opposite changes in the respective optical path lengths of the first and second beam arms during freefall of the first test mass relative to the second test mass, in response to the effects of gravity, thereby creating a multiplication or amplification of the number of fringe is created to enhance the resolution of the measurement of gravity. However, in response to distracting external disturbances which adversely affect the measurement of gravity, the optical path lengths of the first and second being arms are equally affected to result in cancellation of the effects of those adverse disturbances when the first and second light beams are combined interferometrically to create the fringes. Thus, the present invention provides the desirable effect of multiplying the number of fringes created while simultaneously suppressing or eliminating the adverse influences from both long and short period disturbances, thereby simultaneously enhancing the accuracy of the gravity measurement.

Other aspects of the invention involve some or all of the following. Each test mass has a first reflective surface which is oriented in the same direction as the direction of freefall of the first test mass and a second reflective surface which is oriented in the opposite direction of freefall of the first test mass. The first light beam impinges upon and reflects from the first reflective surface of one test mass and the second reflective surface of the other test mass, and the second light beam impinges upon and reflects from the second reflective surface of the one test mass and the first reflective surface of the other test mass. The first and second beam arms are oriented parallel to one another and to the path of freefall movement of the first test mass. More than two fringes are created for each wavelength of distance that the first test mass moves during freefall relative to the second test mass. The value of gravity is derived from counting the number of fringes and the time of freefall of the first test mass.

A more complete appreciation of the present invention and its scope may be obtained from the accompanying drawings, which are briefly summarized below, from the following detailed description of presently preferred embodiments of the invention, and from the appended claims.

DETAILED DESCRIPTION

Figure 1:
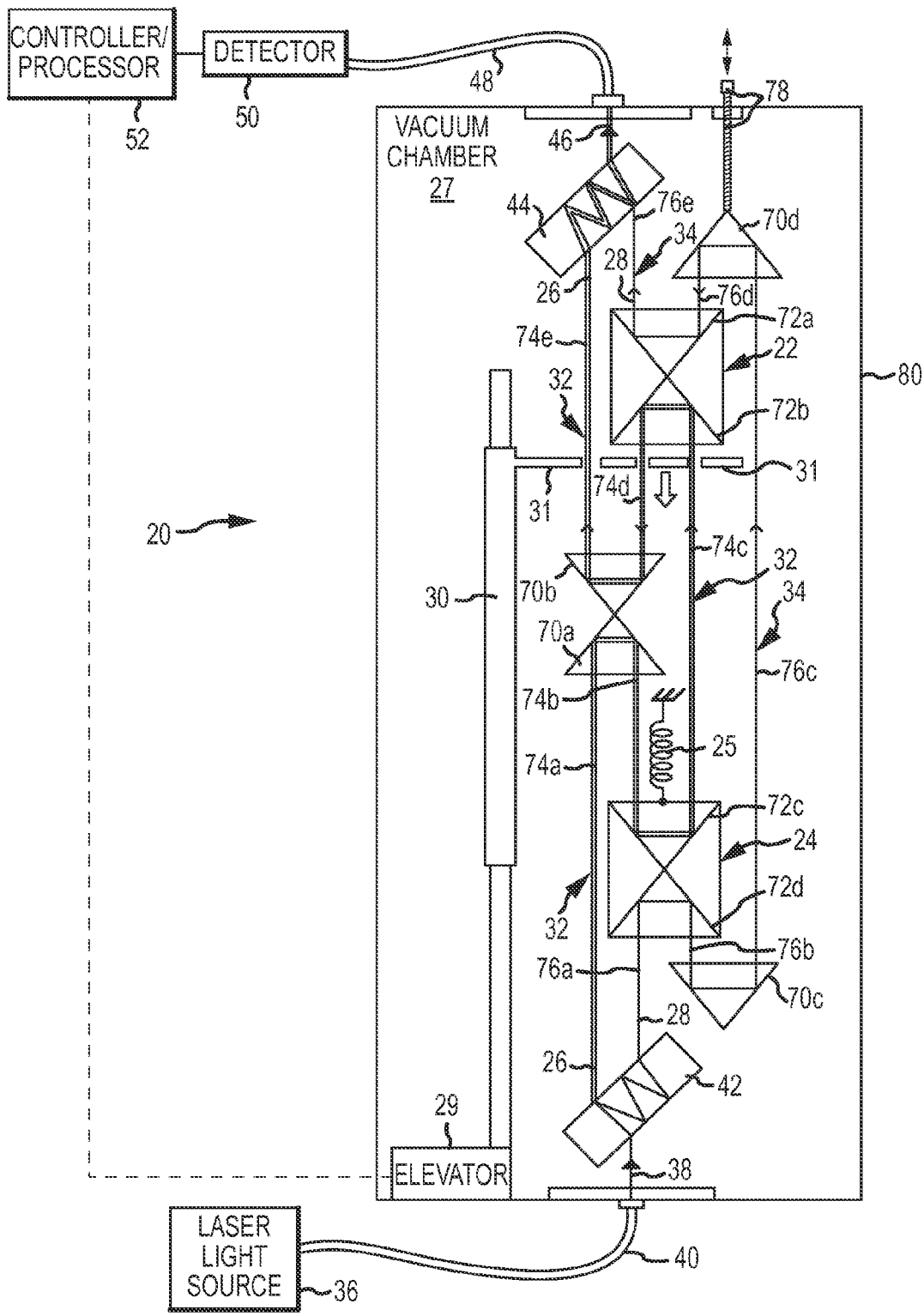
FIG. 1 is a generalized block and schematic diagram of an optical interferometric gravimeter which embodies the invention.

An optical light beam interferometric gravimeter 20 which embodies the present invention is shown in FIG. 1, but aspects of the invention may be embodied in other devices and methods used for measuring a characteristic of gravity. The gravimeter 20 is used to measure a value of gravity by determining the distance (D) that a test mass 22 freefalls solely under the influence of gravity and the time (t) of its free fall. The value of gravity (g) is calculated from that information using the well known physics equation $D=\frac{1}{2}g\, t^2$.

The movement of the freefalling test mass 22 is relative to a reference test mass 24 which is positioned substantially stationarily and isolated from external long period disturbances, including seismic noise, by a conventional long period isolation device 25. The gravity-induced acceleration of the freefalling test mass 22 toward the reference test mass 24 decreases the relative physical separation distance between the test masses 22 and 24. An elevator 29, elevator frame 30 and support device 31 release the test mass 22 to fall freely solely under the influence of gravity and catch the test mass 22 at the end of its freefall. Releasing the test mass 22 for freefall is accomplished by accelerating the elevator frame 30 and support device 31 downward at a rate greater than the acceleration of gravity. Catching the test mass at the end of its freefall is accomplished by decelerating the elevator frame 30 and support device 31 at a rate less than the acceleration of gravity and allowing the freefalling test mass 22 to settle on the support device 31.

The distance (D) of freefall of the test mass 22 relative to the reference test mass 24 is measured by two light beams 26 and 28. The light beams 26 and 28 traverse optical paths referred to herein as beam arms 32 and 34, respectively. The beam arms 32 and 34 are oriented to cause each light beam 26 and 28 to impinge on and reflect from both the freefall test mass 22 and the reference test mass 24.

The light beams 26 and 28 enter the beam arms 32 and 34 having the same frequency and a fixed phase relationship. Both light beams 26 and 28 are derived from a single constant-frequency light source 36, such as a laser. A single input light beam 38 from the light source 36 is conducted through an optical fiber 40 to a beam splitter 42, and the beam splitter 42 creates the two light beams 26 and 28. Both light beams 26 and 28 traverse the beam arms 32 and 34 at the speed of light.

The decreasing relative physical separation of the two test masses during freefall of the test mass 22 creates a change in the relative lengths of the beam arms 32 and 34. The relative change in path length of the beam arms 32 and 34 results in a change in the relative phase relationship of the light beams 26 and 28 when they exit the beam arms 32 and 34. The phase change occurs because the light beam 26 and 28 traverse different distances in the relatively changed path lengths of the beam arms 32 and 34.

After traversing the relatively changed length beam arms 32 and 34, the light beams 26 and 28 are combined in a beam combiner 44 into a single output light beam 46. The relatively changed phase relationship of the combined light beams 26 and 28 creates well-known optical fringes 60 (FIG. 6) in the output light beam 46. The number of fringes 60 which occur during that time (t) of freefall of the test mass 22 establishes the distance (D) that the test mass 22 moves during the time of freefall.

The output light beam 46 containing the fringes 60 is conducted by an optical fiber 48 to a conventional detector 50. The detector 50 generates signals which correspond to characteristics of the output light beam 46, including signals which correspond to the interference fringes. A controller/processor 52 responds to the fringe signals from the detector 50 and determines the value of gravity from the number of fringe signals, the time of freefall and the initial frequency of the light beams 26 and 28, by executing well known interferometric analysis and processing algorithms.

A vacuum chamber 27 within a housing 80 of the gravimeter 20 provides an environment which is as close as possible to a perfect vacuum. The near-perfect vacuum eliminates as many gas molecules as possible from within the chamber 27. By eliminating as many gas molecules as possible, drag on the freefalling test mass 22 is diminished, thereby enhancing the accuracy of the gravity measurement by minimizing the adverse influence of drag on the freefall test mass 22.

Isolating and stabilizing the reference test mass 24 with the long period isolation device 25 prevents long period seismic noise or other external long. disturbances from changing the optical path length of the light beams 26 and 28 by moving the reference test mass 24. Any such change in path length would adversely affect the measurement of gravity, since the change in path length does not result from the effect of gravity on the freefall test mass 22 but instead results from the external disturbance. Without isolating and stabilizing the reference test mass 24, an accurate measurement of gravity is impossible or very difficult to achieve.

To provide an effective level of inertial stabilization and isolation of the reference test mass 24, the period of the natural frequency response of the long period isolation device 25 should be about 10-20 times or more longer than the typical period of seismic noise. Although the long period isolation device 25 is shown schematically in FIG. 1 as a spring, in actuality the device 25 is more complex with multiple springs, sensors, feedback controllers and a number of other active electronic components, as is well known. Seismic noise usually has no effect on the test mass 22 because it is decoupled or disconnected from the effects of seismic noise when in freefall. Furthermore, the frequency of seismic noise is so low that it has no significant capability of rotating the test mass 22 at the instant when the test mass 22 is released for freefall, as compared to short period disturbances which do have the capability of rotating the test mass 22 at the instant of release for freefall, as discussed below.

In addition to preventing or greatly diminishing the effects of the long period disturbances, the gravimeter 20 also prevents or greatly diminishes the effects of short period disturbances. Short period disturbances are random vibrations and perturbations which are man-made or which arise from natural causes such as wind gusts. Short period disturbances may result from natural and random variations in the frequency of the laser light source 36.

Short period disturbances have a significant adverse influence on the freefalling test mass 22. Short period perturbations or vibrations of the housing 80 typically impact the test mass 22 at the instant when it is released into freefall, and the impact causes random rotation of the test mass 22 during freefall. This is illustrated in exaggerated form in FIG. 2, where the upper test mass 22 is shown rotated clockwise by the effect of a short period disturbance. Rotation of the test mass 22 during freefall changes the path length of a light beam which reflects from the rotating test mass. Since the change in path length is not the result of gravity, rotation of the test mass creates erroneous information and compromises the accuracy of the gravity measurement.

The relatively long period of the long period isolation device 25 provides some level of inertial stabilization and isolation of the reference test mass 24 against short period external disturbances. However, the feedback control system of the long period isolation device 25 is intended to respond principally to long period disturbances. Consequently, the control loop response of the long period isolation device 25 may not be fully effective in suppressing and isolating some effects of short period disturbances.

To the extent that the long period isolation device 25 does not fully protect the reference test mass 24 against short period disturbances, the reference test mass 24 may also rotate slightly in response to short period disturbances. The extent of rotation of the reference test mass 24, if any at all, will usually be considerably less than that of the freefall test mass 22. For purposes of illustration in FIG. 2, the amount of rotation of the reference test mass 24 is shown as counterclockwise and in greatly exaggerated form. Thus, the random effect of short period disturbances may rotate both test masses in the same or different directions, or rotate one test mass but not the other, or rotate one test mass to a different relative degree than the other test mass is rotated.

By arranging the beam arms 32 and 34 to impinge each light beam 26 and 28 on an upward facing retroreflector 72a or 72c of one test mass 22 or 24 and a downward facing retroreflector 72b or 72d of the other test mass 22 or 24, as described below, the rotation of either or both test masses 22 and 24 creates equal changes in path lengths of both light beams 26 and 28. For example, the beam arm 32 increases in length while the beam arm 34 also increases in length by an equal amount, and vice versa. When the light beams 26 and 28 are combined in the beam combiner 44 to form the output beam 46, the effects of the equal changes in path length are canceled by common mode rejection. Accordingly, the arrangement of the beam arms 32 and 34, and the optical elements used in those beam arms to direct the light beams 26 and 28, has the advantageous effect of substantially eliminating the effect of short period disturbances on the measurement of gravity obtained from the gravimeter 20. To the extent that the disturbances are not fully suppressed by the long period isolation device 25, those disturbances are also suppressed by the arrangement of the beam arms 32 and 34 and the optical elements used in those beam arms to direct the light beams 26 and 28. The accuracy of the gravity measurement is thereby significantly enhanced. The details of the beam arms 32 and 34, the test masses 22 and 24 and the optical elements of the beam arms which advantageously eliminate the effects of disturbances are discussed below.

The beam arms 32 and 34 include four conventional corner cube retroreflectors 70a-70d positioned within the vacuum chamber 27. The retroreflectors 70a, 70b and 70c are fixed in position, and the retroreflector 70d is adjustable in position. The test masses 22 and 24 each include one upward facing retroreflector 72a and 72c and one downward facing retroreflector 72b and 72d, respectively. The downward facing retroreflectors 72b and 72d face in the same direction that the test mass 22 freefalls, and the upward facing retroreflectors 72a and 72c face in the opposite direction from the direction that the test mass 22 freefalls. The retroreflectors 72a, 72b and 72c, 72d are connected to and are a part of the test masses 22 and 24, respectively.

The light beams 26 and 28 each reflect from one upward facing retroreflector of one test mass 22 or 24 and one downward facing retroreflector of the other test mass 24 or 22. Specifically, the light beam 26 in the beam path 32 impinges upon and reflects from the upward facing retroreflector 72c of the reference test mass 24 and the downward facing retroreflector 72b of the freefall test mass 22, and the light beam 28 in the beam path 34 impinges upon and reflects from the downward facing retroreflector 72d of the reference test mass 24 and the upward facing retroreflector 72a of the freefall test mass 22.

Figure 2:
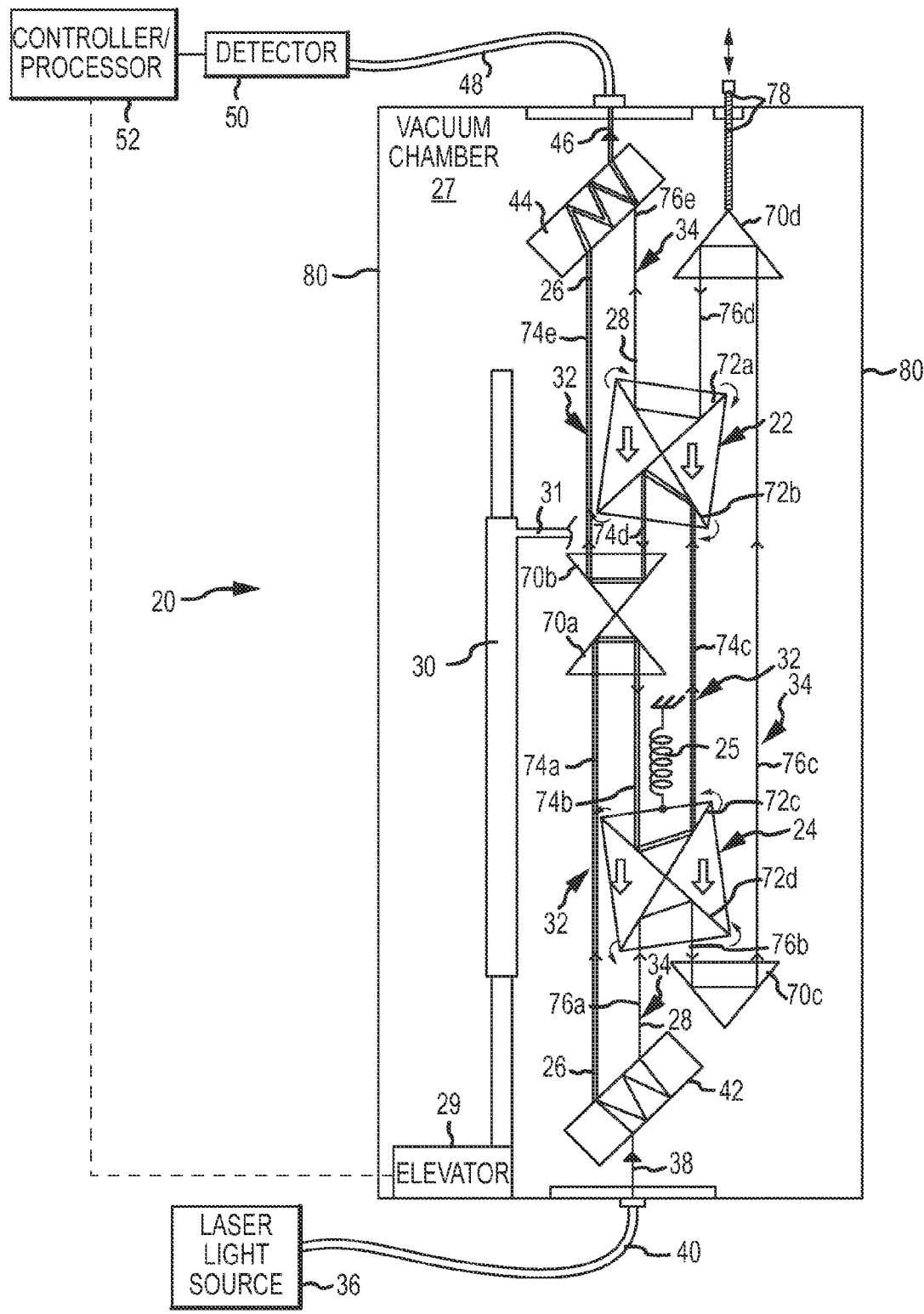
FIG. 2 is a diagram of the gravimeter shown in FIG. 1, showing an exaggerated amount inadvertent rotation of test masses during a gravity measurement.

The interaction of each light beam 26 and 28 in each beam arm 32 and 34 with the upward facing retroreflector of one test mass and the downward facing retroreflector of the other test mass has the effect of eliminating the adverse effects of disturbances. When either one or both of the test masses 22 and 24 rotate during freefall, as shown in FIG. 2, the lengths of both beam arms 32 and 34 change by the same amount, since the rotation of one or both test masses changes the length of both beam arms 32 and 34 by the same amount. Consequently the relative length relationship of the beam arms 32 and 34 is unaffected by rotation of one or both of the test masses during freefall caused by short period disturbances.

Since the lengths of the beam arms 32 and 34 change by the same amount when the test masses 22 and 24 rotate, interferometrically combining the light beams 26 and 28 eliminates the adverse effect of the equal path length changes due to common mode rejection. Consequently, the adverse effects of rotation of one or both of the test masses on the measurement of gravity is eliminated. The gravity measurement available from the gravimeter 20 is substantially free of errors arising from both short period disturbances as well as from long period disturbances. The beneficial effect of eliminating or substantially reducing the adverse effects of short and long period disturbances by reflecting both light beams 26 and 28 from both test masses 22 and 24 is understood from the details of the beam arms 32 and 34.

The beam arms 32 and 34 include five segments 74a-74e and 76a-76e, respectively, all of which extend in sequence from the beam splitter 42 to the beam combiner 44. The beam splitter 42 delivers the light beam 26 into the first segment 74a of the beam arm 32. The light beam 26 in the first segment 74a impinges upon the retroreflector 70a and reflects into the second segment 74b of the beam arm 32. Light from the second segment 74b impinges upon the upward facing retroreflector 72c of the reference test mass 24 and reflects into the third segment 74c of the beam arm 32. Light from the third segment 74c impinges upon the downward facing retroreflector 72b of the freefall test mass 22 and reflects into the fourth segment 74d of the beam arm 32. Light from the fourth segment 74b impinges upon the retroreflector 70b and reflects into the fifth segment 74e of the beam arm 32 leading to the beam combiner 44.

The beam splitter 42 delivers the light beam 28 into the first segment 76a of the beam arm 34. The light beam 28 in the first segment 76a impinges upon the downward facing retroreflector 72d of the reference test mass 24 and reflects into the second segment 76b of the beam arm 34. Light from the second segment 76b impinges upon the retroreflector 70c and reflects into the third segment 76c of the beam arm 34. Light from the third segment 76c impinges upon the retroreflector 70d and reflects into the fourth segment 76d of the beam arm 34. Light from the fourth segment 76d impinges upon the upward facing retroreflector 72a of the freefall test mass 22 and reflects into the fifth segment 74e of the beam arm 34 leading to the beam combiner 44.

The length of the beam arms 32 and 34 is equal at one point during the freefall of the test mass 22, such as at the point where the test mass 22 is released to fall freely. Establishing this equality in path lengths assures that the disturbances affect both beam arms 32 and 34 equally, and allow the effect of gravity on the freefall test mass 22 to create the difference in path lengths. Equal lengths of the beam arms 32 and 34 are achieved by adjusting the vertical position of the retroreflector 70d in the beam arm 34, as shown in FIG. 1. The position of the retroreflector 70d is adjusted by manipulation of an adjustment device, such as a micrometer screw 78, which extends through the housing 80 that defines the vacuum chamber 27. Adjusting the vertical position of the retroreflector 70d changes the length of the beam arm segments 76c and 76d, and therefore changes the entire length of the beam arm 34 to make it equal with the length of the beam arm 32 at the desired one point.

A multiple frequency light beam, such as a Mercury band limited light beam, is used as the input light beam 38 for purposes of calibrating the length of the beam arms 32 and 34. The test mass 22 is positioned stationarily at the desired position where the path lengths are to be equal. So long as the beam arms 32 and 34 are not equal in length, optical fringes will result in the output light beam 46 in response to the multiple frequency input light beam. When the length of the beam arm 34 is adjusted to equal the length of the beam arm 32, by adjusting the position of the retroreflector 70d, the output light beam 46 no longer includes any optical fringes.

The beam arms 32 and 34 are inherently parallel to one another, despite the movement of the test masses 22 and 24. If the beam arms 32 and 34 were not parallel to one another, the non-parallel deviation of one of the beam arms would cause it to have a different length compared to the other beam arm. Such a difference in path length would cause the light beam in one beam arm to travel a different distance than the light travels in the other beam arm, resulting in relative phase changes between the light beams 26 and 28. The phase shifts resulting from unequal beam arm lengths would create erroneous interference fringes that would lead to errors in determining the value of gravity or other characteristic of gravity being measured.

Changes in direction of the light beams 26 and 28 within the beam arms 32 and 34, and the parallel orientation of the beam arms segments 74a-74e and 76a-76e, are achieved by the retroreflectors 70a-70d and 72a-72d. Use of the retroreflectors to change the direction of the light beams ensures parallelism in the beam arms 32 and 34, thereby maintaining equal path lengths, as understood from the following discussion of a single conventional retroreflector 75 shown in FIGS. 3A-3C. The retroreflector 75 exemplifies the characteristics of each retroreflector 70a-70d and 72a-72d.

Figure 3A:
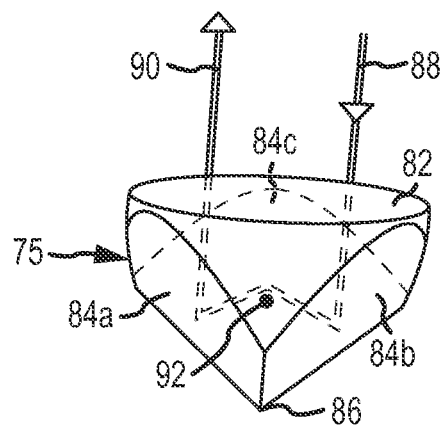
FIGS. 3A, 3B and 3C are perspective views of a conventional corner cube retroreflector of the type used in the gravimeter shown in FIG. 1, each showing an incident light beam and a reflected light beam.

As shown in FIG. 3A, the retroreflector 75 is constructed of glass or other high-grade transparent optical material. An entry-exit surface 82 and three mutually perpendicular wall surfaces 84a-84c are machined or otherwise formed on the retroreflector 75. The wall surfaces 84a-84c intersect one another perpendicularly and define a corner 86 which faces toward the entry-exit surface 82. The wall surfaces 84a-84c extend at the same angle relative to the entry-axis surface 82. The wall surfaces 84a-84c are coated with a reflective material (not shown) to cause light impinging on the wall surfaces 84a-84c to reflect.

An incident light beam 88 enters the retroreflector 75 through the entry-exit surface 82 and reflects off of the reflective wall surfaces 84a-84c and then exits the retroreflector 75 through the entry-exit surface 82 as a reflected light beam 90. An optical characteristic of the retroreflector 75, which is created by the angular relationship of the reflective wall surfaces 84a-84c, is that the reflected light beam 90 always projects parallel to the incident light beam 88. This parallel relationship is maintained even if the light beam 88 does not impinge on the entry-exit surface 82 orthogonally. Unlike a mirror, the retroreflector 75 therefore reflects light back in a direction parallel to the incident light, regardless of the angle of incidence of the light beam 88 with respect to the entry-exit surface 82. This parallel reflection quality causes the light beams in the beam arm segments 74b-74e and 76b-76e (FIG. 1) to remain parallel with respect to one another and maintain the substantially equal path lengths within the vacuum chamber 27 of the gravimeter 20 (FIG. 1), in response to disturbances.

Conventional retroreflectors can also be of the open variety. An open retroreflector is constructed of mirrors or other high-grade reflective optical material oriented to form the reflective surfaces 84a, 84b and 84c. An open retroreflector can be used in place of each retroreflector described herein. An open retroreflector has the effect of not changing the speed of light which occurs when the light passes through the changed medium of the optical body of a closed retroreflector. Using open retroreflectors causes the speed of light to remain constant throughout the entire beam arms 32 and 34, because the light beams do not pass through an optical body, thereby avoiding any phase or path length differences that might be created by conducting the light beams through a different medium.

The parallel surface beam splitter 42 and the parallel surface beam combiner 44 contribute to the parallelism in the beam arms 32 and 34, as understood from FIGS. 1 and 2. An inherent characteristic of the parallel surfaces of the beam splitter 42 is that the two light beams 26 and 28 are delivered in a parallel relationship. Furthermore, the two light beams 26 and 28 extend in a parallel relationship with the input light beam 38. A similar situation exists with respect to the beam combiner 44, since the beam combiner 44 is a beam splitter used for the opposite purpose. The optical characteristics of the beam combiner 44 are the same as the beam splitter 42, causing parallel light beams 26 and 28 leaving the parallel beam arms 32 and 34 to be combined accurately in the single output beam 46 while preserving their relative phase relationship. The beam combiner 44 delivers the output signal 46 in parallel relationship to the light beams 26 and 28 delivered from the beam arms 32 and 34.

The parallel surface beam splitter 42 and the parallel surface beam combiner 44 also contribute to maintaining the previously-described substantial equality in the optical path lengths. An inherent characteristic of the parallel surface beam splitter 42 and beam combiner 44 is that the optical path length of the first light beam 26 in the beam splitter 42 added to the optical path length of the first light beam 26 in the beam combiner 44 is equal to the optical path length of the second light beam 28 in the beam splitter 42 added to the optical path length of the second light beam 28 in the beam combiner 44. As a consequence, the light beams passing through the parallel surface beam splitter 42 and beam combiner 44 retain the substantial equality in optical path lengths of the beam arms 32 and 34.

Because the light beams 26 and 28 in the beam arms 32 and 34 are parallel to one another in the vacuum chamber 27, due to the use of the retroreflectors 70a-70d and 72a-72d, and because output light beam 46 is parallel to the light beams 26 and 28 in the beam arms 32 and 34 due to the effect of the parallel surface beam combiner 44, a vertical orientation of the test masses 22 and 24 can be established by evaluating the vertical orientation of the output light beam 46. When the output light beam 46 is vertically oriented, the test masses 22 and 24 will be vertically oriented, due to the parallelism of the beam arms 32 and 34. An exact vertical orientation of the test masses 22 and 24 is essential in establishing an accurate value of gravity. If the test masses 22 and 24 are not exactly vertically oriented, the gravity measurement will not be accurate. The position of the gravimeter 20 is adjusted to achieve a precise vertical alignment of the test masses 22 and 24 as determined by the vertical projection of the output light beam 46.

As an alternative to conducting the input and output light beams 38 and 46 through the optical fibers 40 and 48, mirrors could be used. The optical fibers 40 and 48 could be eliminated altogether by directly connecting the light source 36 to the housing 80 and directly injecting the light beam 38 into the gravimeter 20 and by directly connecting the detector 50 to the housing 80 to directly receive the output light beam 46 from the combiner 44.

Figure 3B:
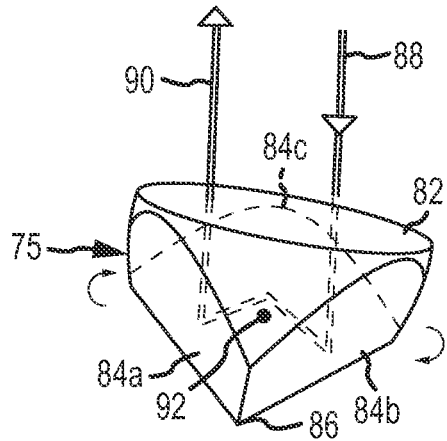
Figure 3C:
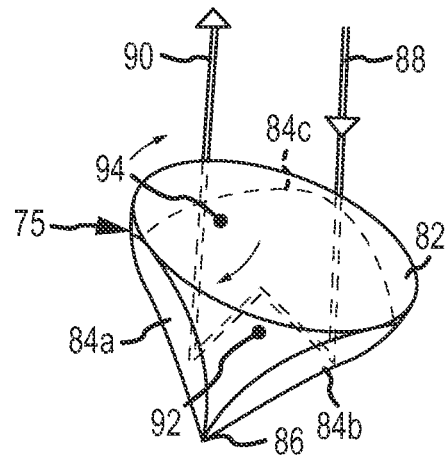

The manner in which the retroreflectors 72a-72d of the test masses 22 and 24 are effective in creating equal changes in the length of the beam arms 32 and 34 arising from rotation of one or both of the test masses 22 and 24, while maintaining the parallel relationship of the impinging and reflected light beams, also involves characteristics exemplified by the retroreflector 75 shown in FIGS. 3A, 3B and 3C. The retroreflector 75 has an optical center point 92 which is equidistant from each of the reflective wall surfaces 84a-84c. When the retroreflector 75 is rotated about the optical center point 92, the path length of the light beam from the point of incidence on the entry-exit surface 82 to the point of exit from the entry-exit surface 82 remains constant. Thus, when the retroreflector 75 is rotated about the center point 92, the path length within the retroreflector remains constant regardless of the angle of the incident light beam 88 relative to the entry-exit surface 82. FIG. 3B illustrates the situation where the retroreflector 75 has been rotated slightly around the optical center point 92, but the length of the light path within the retroreflector 75 remains the same as when the incident light beam 88 intersects the entry-exit surface 82 orthogonally (FIG. 3A).

When the retroreflector 75 is rotated about a point 94 which is not coincident with the optical center point 92, as shown in FIG. 3C, the length of the light path within the retroreflector 75 increases in length slightly, and that increase in length is related to the amount of angular rotation about the point 94 relative to the optical center point 92. For similar changes in angular rotation about points which have the same relative relationship to the optical center point 92, the increase in the length of the light path within the retroreflector 75 is the same.

Figure 4A:
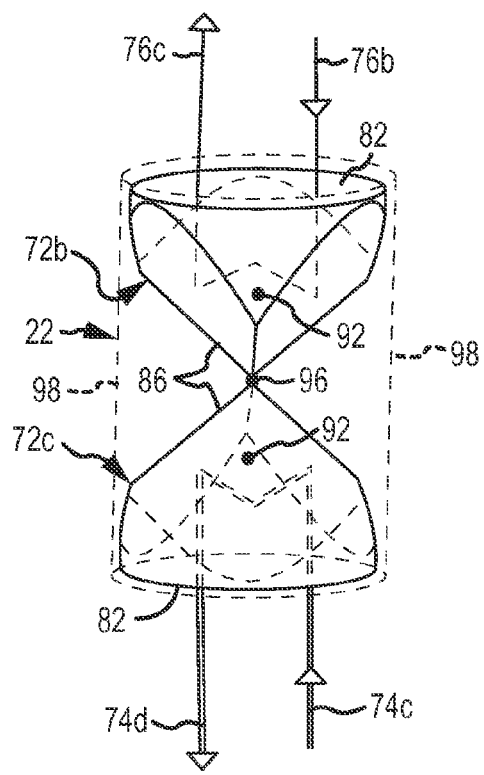
FIGS. 4A and 4B are perspective and schematic views of test masses of the type used in the gravimeter shown in FIGS. 1 and 2, which each include retroreflectors of the type shown in FIGS. 3A-3C.
Figure 4B:
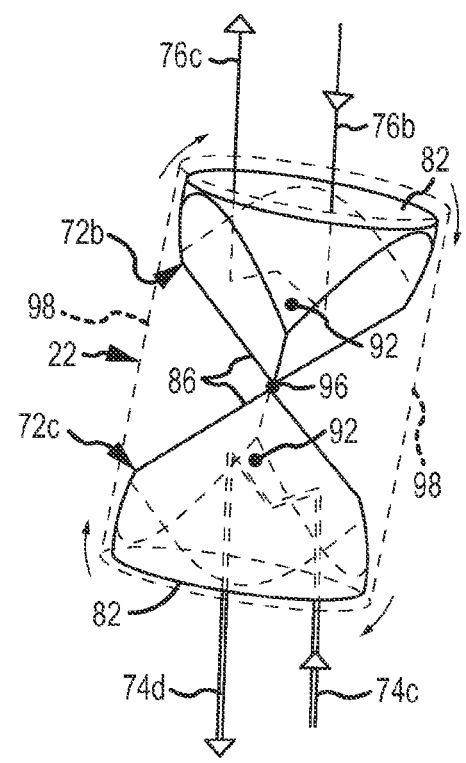

The above described properties of retroreflectors are used to advantage in the test masses 22 and 24, as explained in conjunction with FIGS. 4A and 4B. The characteristics of the test mass 22 shown in FIGS. 4A and 4B apply equally to the test mass 24. The retroreflectors 72a and 72b are positioned on the test mass 22 with the entry-exit surfaces 82 facing in opposite directions and extending parallel to one another. The corners 86 (FIGS. 3A-3C) of the retroreflectors 72a and 72b are adjacent to one another. The optical center points 92 of the retroreflectors 72a and 72b are located equidistant from a center of mass point 96 of the test mass 22. The two optical center points 92 and the center of mass point 96 are located co-linearly. The corners 86 (FIGS. 3A-3C) are also located coincident with the co-linear relationship of the two optical center points 92 and the center of mass 96. In this configuration, the distance from the center of mass point 96 to the optical center point 92 of the retroreflector 72a is equal to the distance from the center of mass point 96 to the optical center point 92 of the retroreflector 72b.

The test mass 22 has a physical structure 98 which holds the two retroreflectors 72a and 72b in place. The physical structure 98 of the test mass 22 and the two retroreflectors 72a and 72b are balanced so that the center of mass point 96 of the test mass 22 is located midway between the two optical center points 92. Such balancing may be achieved by moving adjustable weights (not shown) associated with the physical structure 98.

Locating the center of mass point 96 of the test mass 22 in the manner described causes the test mass 22 to rotate about the center of mass point 96 if the test mass 22 rotates while freefalling, as shown in FIG. 4B. Rotation about the center of mass point 96 causes the optical center points 92 of both retroreflectors 72a and 72b to rotate in the same amount and in the same direction relative to the center of mass point 96, as shown in FIG. 4B. This similar rotation in the same direction causes the parallel light beams which impinge on the retroreflectors 72a and 72b to change equally in their lengths. Consequently, rotation of the test mass 22 does not adversely affect the relative length of the beam arms 32 and 34, because such rotation has the same effect on the length of both beam arms 32 and 34. Since the beam arms 32 and 34 change length by the same amount when the test mass 22 rotates, the accuracy of measurement is not adversely affected.

If the test mass 22 rotates about any point other than the center of mass point 96, then the distances over which the respective light beams in the beam arms 32 and 34 travel will not be equal. However, when the test mass 22 is freefalling, it can rotate only about its center of mass point 96, so rotation of the test mass 22 about some point other than the center of mass point 96 is not possible during freefall.

The suspension of the reference test mass 24 by the long period isolation device 25 (FIGS. 1 and 2) is applied effectively at the center of mass of the reference test mass 24. Suspended in this manner, any rotation of the reference test mass 24 occurs about its center of gravity in much the same way that rotation of the freefalling test mass 22 occurs about its center of mass 96 (FIGS. 4A and 4B). Thus, the suspension effects of the long period isolation device 25 (FIG. 1) causes any rotation of the reference test mass 24 to maintain the equal path lengths of the light beams 26 and 28 which impinge upon and reflect from the reference test mass in the same manner that rotation of the freefalling test mass 22 maintains equal path lengths of the light beams 26 and 28.

Figure 5:
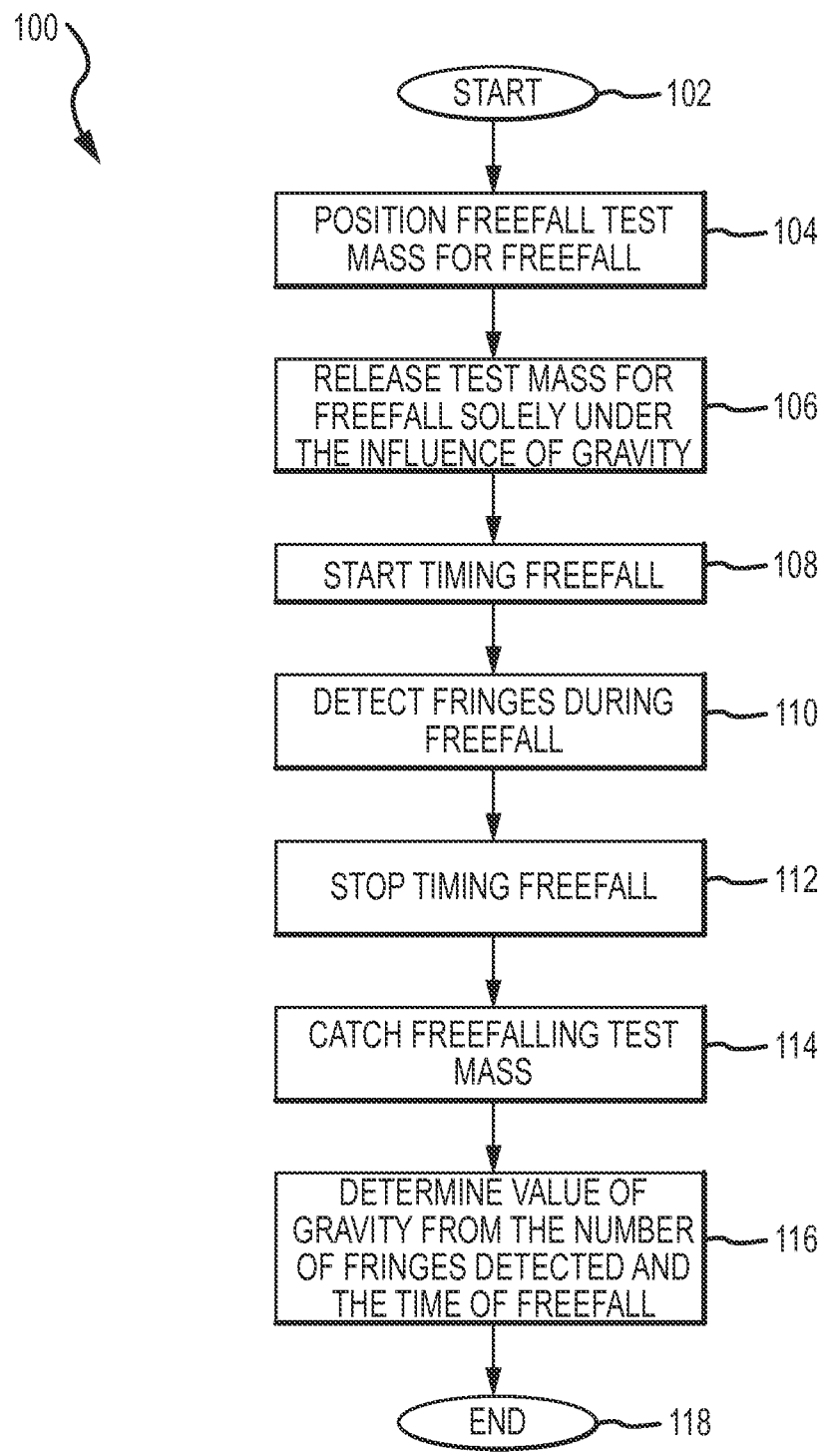
FIG. 5 is a flow chart of measuring a value of gravity in accordance with the invention and by using the gravimeter shown in FIG. 1.

The use of the gravimeter 20 to determine the value of gravity is illustrated by the process flow 100 shown in FIG. 5, which is explained in connection with the components of the gravity meter 20 shown in FIG. 1. The process flow 100 begins at 102. At 104, the freefall test mass 22 is positioned for freefall, by operation and movement of the elevator 29, elevator frame 30 and support device 31 under the control of the controller/processor 52. At 106, the freefall test mass is released to freefall solely under the influence of gravity. The freefall test mass is released for freefall by accelerating the elevator frame 30 and support device 31 downward at a rate greater than the typical value of gravity. Simultaneously with or shortly after releasing the test mass 22 for freefall, the controller/processor 52 starts measuring or timing the amount of time during which the test mass 22 freefalls, as shown at 108. The controller/processor 52 recognizes that the test mass 22 is in freefall whenever the controller/processor 52 establishes a controlled downward acceleration of the elevator frame 30 and the support device 31 at a rate which exceeds the typical value of gravity.

The fringes created when the test mass 22 free falls are detected at 110. The output signal 46 containing the fringes is detected by the detector 50 and processed by the controller/processor 52. After the test mass 22 has been in freefall for a preselected amount of time, the controller/processor 52 stops timing the freefall of the test mass 22, as shown at 112. The number of fringes detected during the time that the test mass 22 was freefalling is determined by the controller/processor 52 during the timed freefall. Thereafter, at 114, the controller/processor 52 reduces the downward acceleration of the elevator frame 30 and support device 31 and catches the freefall test mass 22 at 114 by allowing it to settle onto the support device 31.

It is not necessary that the timed freefall extend from the point at 106 when the freefall test mass 22 is initially released to freefall to the point at 114 when the freefall test mass 22 is caught. The time duration of freefall is established to end at an arbitrary time period after freefall commences and before the test mass is caught. During this arbitrary amount of freefall time, the number of fringes counted establishes the distance that the test mass 22 moves solely under the influence of gravity (as understood from FIG. 6). Counting this number of fringes establishes the value of D, and the arbitrary amount of time measured during which freefall generates the counted number of fringes establishes the value of t, thereby allowing the value of gravity to be calculated by the controller/processor 52 (FIG. 1) according to the previously described formula $D=\frac{1}{2}g\,t^2$, as shown at 116. Thereafter, the process flow 100 terminates at 118.

The end result of executing the process flow 100 is the determination of the value of gravity. In some practical applications, the process flow 100 is repeated several times in succession, and the value of gravity is derived by averaging the individual gravity values determined after each execution of the process flow 100. Averaging the individually-determined gravity values helps eliminate or reduce anomalous errors.

Many significant improvements result from the present invention. Common mode rejection cancels or ameliorates the adverse effects of external short period disturbances. The common mode rejection results in substantial part because the effects of external disturbances on the beam arms 32 and 34 are equal, allowing those adverse influences to be rejected or canceled by common mode rejection when the light beams 26 and 28 are combined interferometrically.

Balancing the test masses 22 and 24 with their centers of mass relative to the optical center points of their retroreflectors preserves the equal relative length relationship of the beam arms 32 and 34, despite rotation of the freefall test mass 22 that might occur during freefall or the rotation of the reference test mass 24 if it is not fully isolated from short period disturbances by the long period isolation device 25. Rotation of one or both of the test masses 22 and 24 does not change the optical path length of both beam arms 32 and 34. The rotation of the test mass 22 during freefall is not a source of disturbance-induced interference fringes which adversely influence and accurate measurement of the gravity value.

The parallel characteristics of the beam arms 32 and 34 are facilitated by the use of the parallel path optical elements 44, 46, 70a-70d and 72a-72d (FIG. 1) which prevent the beam arms 32 or 34 from deviating from the parallel relationship with one another and thereby preserve the equality in length except for the desirable changes in relative length which occur during freefall of the test mass 22.

Use of the parallel path optical elements in the gravimeter 20 also greatly facilitates its assembly and construction. The difficulties associated with aligning and maintaining mirrors and other non-inherently parallel path optical elements is avoided. Fixing the position of the retroreflectors 70a-70d becomes less critical because the retroreflectors create the parallelism in the light beams 26 and 28 even though the angular orientation of each retroreflector may not be precisely exact. A similar situation exists with the retroreflectors 72a-72d attached to the test masses 22 and 24. Assembling and using the gravimeter 20 under these circumstances is considerably easier than the tedious and often changeable nature of attempting to establish and maintain an exact angle of reflecting mirrors within a conventional gravity measuring instrument. Furthermore, the parallel path optical elements maintain the light beams in their intended parallel paths even during rough handling which inevitably occurs during use in an outdoor environment.

The beam arms 32 and 34 also offer the beneficial effect of eliminating frequency and phase variations in the laser light source 36, which would otherwise cause gravity measurement errors comparable to those arising from short period disturbances. Most laser light sources 36 are subject to slight frequency and phase variations during normal operation. In addition, movement of the optical fiber 40 can also introduce frequency and phase relationships in the input light beam 38 delivered to the beam splitter 42. Even further still, if for some unanticipated reason, the beam splitter 42 should move unexpectedly relative to the input light beam 38, the light beams 26 and 28 will contain the slight frequency and phase variations. Any of these circumstances cause the light beams 26 and 28 leaving the beam splitter 42 to have slight frequency and phase variations.

Any frequency and phase shifts from the single laser light source 36 are present equally in the light beams 26 and 28 conducted in the beam arms 32 and 34, since the light beams 26 and 28 are derived from the single input light beam 38 (FIG. 1) which is transmitted through a single optical fiber 40. As a result, any frequency and phase variations in the single input light beam 38 are canceled by common mode rejection when the light beams 26 and 28 are combined in the single output light beam 46. A similar common mode rejection occurs with respect to phase differences introduced by movement or vibration of the optical fiber 48 which conducts the output light beam 46 to the detector 50.

In addition to the beneficial aspects of the beam arms 32 and 34 allowing for cancellation of the undesirable effects of disturbances by common mode rejection, the beam arms 32 and 34 also increase the number of fringes created. Increasing the number of fringes makes detecting and counting of the fringes easier to accomplish, and increasing the number of fringes created also achieves a more accurate measurement of the distance traveled by the freefall test mass 22.

Figure 6:
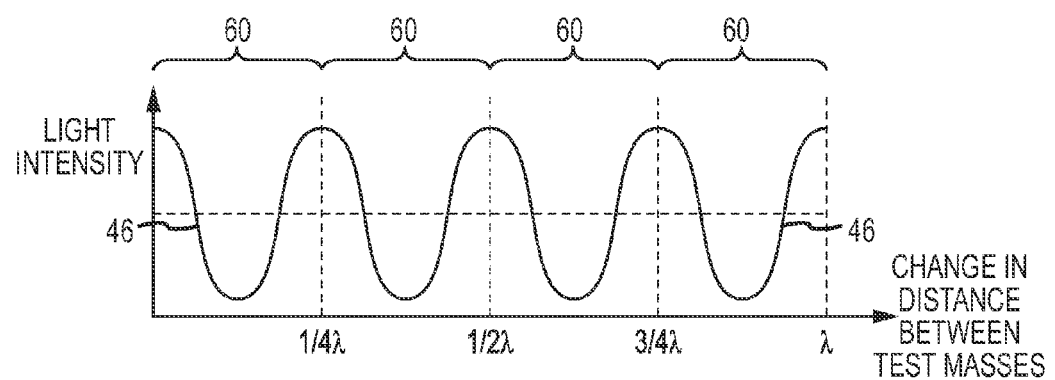
FIG. 6 is a generalized illustration of interference fringes which occur during use of the gravimeter shown in FIG. 1.

The relationship of the number of fringes 60 relative to the change in the light beam path lengths caused by movement of the freefall test mass 22 relative to the stationary test mass 24 is known as an amplification factor. The gravimeter 20 produces an amplification factor of four, which is twice the amplification factor from a normal Michelson interferometer of the type used in most absolute gravimeters such as the one described in U.S. Pat. No. 5,351,122. A Michelson interferometer reflects only one light beam from the freefall test mass. In this invention, both the reflected and reference the light beams 26 and 28 impinge upon and reflect from both of the test masses 22 and 24. As a result, the gravimeter 20 produces an interference fringe signal that has a phase change equal to four times the difference in the free-fall distance of the test mass 22 relative to the reference test mass 24. This relationship is shown in FIG. 6, where four interference fringes 60 in the output light beam 46 occur for each relative change in distance between the test masses 22 and 24 equal to one wavelength ($\lambda$) of the input light beam 38 (FIG. 1). The amplification factor of four facilitates recognition of the fringes by the detector 50 and the controller/processor 52.

The amplification factor of four from the gravimeter 20 results from the effect of the gravity-induced acceleration on the test mass 22 during freefall changing the lengths of the beam arms 32 and 34. The relative change in the lengths of the beam arms 32 and 34 is four times the amount of relative physical separation of the test masses 22 and 24 during freefall. The following mathematical derivation demonstrates the relationship of the four times change in relative length of the beam arms 32 and 34 compared to the physical separation distance of the test masses 22 and 24.

With the lower test mass 24 positioned stationarily and the upper test mass 22 freefalling the distance $Z_u$, the beam arm 32 is shortened by the amount $2Z_u$, because the beam arm segments 74c and 74d are each shortened by the amount $Z_u$, the distance that upper test mass 22 free falls. The beam arm segments 74a, 74b and 74e remain unchanged in length due to the stationary positions of the lower test mass 24 and the retroreflectors 70a and 70b. Simultaneously, the beam arm 34 is lengthened by a distance of $2Z_u$, because the downward movement of the freefall test mass 22 lengthens each of the beam arm segments 76d and 76e by the amount $Z_u$. The beam arm segments 76a, 76b and 76c remain unchanged in length due to the stationary positions of the lower test mass 24 and the retroreflectors 70c and 70d. Thus, the freefall of upper test mass 22 results in shortening the overall beam arm 32 by the distance 24 and lengthening the overall beam arm 34 by the distance 24.

When the upper test mass 22 falls freely, the optical path length of the beam arm 32 will be changed by the difference in length of the beam arm 32. That changed amount, referred to as $\Delta BA_{32}$ is equal to $-2Z_u$, with the negative value indicating that the path length is shortened. Similarly, the optical path length of the beam arm 34 will be changed by the difference in length of the beam arm 34. That changed amount, referred to as $\Delta BA_{34}$ is equal to $+2Z_u$, with the positive value indicating that the path length is lengthened.

When light beams 26 and 28 from the two changed-length beam arms 32 and 34 are combined by the beam combiner 44, the combined output light beam 46 contains a sinusoidal interference fringe signal whose phase is given by the difference in path length of the two beam arms 32 and 34. The difference in optical path length of the two beam arms 32 and 34, referred to herein as $\Delta L$, is equal to the difference in change in length of the two beam arms 32 and 34, i.e. $\Delta BA_{34}$ and $\Delta BA_{32}$, respectively. Stated mathematically, $\Delta L = \Delta BA_{34} - \Delta BA_{32}$, or $\Delta L = 2Z_U - (-2Z_U)$, or $\Delta L = 4Z_U$. This mathematical derivation shows that the difference in path lengths of the beam arms 32 and 34 is equal to four times the distance that the upper test mass 22 falls relative to the lower stationary reference mass 24, thereby mathematically demonstrating the amplification factor of four.

The amplification factor of four from the gravimeter 20 can also be understood generally in terms of a differential frequency shift of the light beams 26 and 28 in each of the beam arms 32 and 34 due to the well-known Doppler effect. The relative Doppler shift of light for a moving observer is given by the equation $f=f_o\{(1+v/c)/[(1-(v/c)^2]^{1/2}\}$, where $f_o$ is the frequency of light in the rest frame of reference and $f$ is the frequency in the moving frame of reference, v is a velocity of the moving observer, and c is the speed of light. For velocities that are much smaller than the speed of light, which is the case with respect to the freefall test mass 22, a first-order approximation is sufficient, so that $f \cong f_o(1+v/c)$. The change in the frequency, $\Delta f=f-f_o$, therefore is proportional to the ratio of the velocity of the observer to the speed of light or $\Delta f=v/c\ f_o$.

The Doppler shift of a light beam reflecting from a moving mirror is twice this value or $\Delta f=2\ v/c\ f_o$. This can be understood because the moving mirror "sees" a Doppler shifted beam and then emits this new frequency upon reflection. However the new emitted Doppler shifted frequency is again Doppler shifted in the same manner when observed by the stationary observer, which in the case of the gravimeter 20, is any nonmoving portion of it. Each light beam 26 and 28 therefore experiences a Doppler shift which is related to twice the velocity of the freefall test mass 22 from which the light beams 26 and 28 reflect.

The downward freefalling test mass 22 shifts the light beam 26 higher in frequency when the light beam 26 reflects from the downward facing retroreflector 72b and shifts the light beam 28 lower in frequency when the light beam 28 reflects from the upward facing retroreflector 72a. The reflection of both light beams 26 and 28 in this manner has the net effect of giving an overall Doppler shift proportional to twice the difference in velocity of the freefalling test mass 22 relative to the stationary test mass 24. The light beam 26 in the beam arm 32 is Doppler shifted positively to an increased frequency, while the light beam 28 in the other beam arm 34 is Doppler shifted negatively to a decreased frequency. When the beams 26 and 28 are recombined, a signal with a frequency given by the difference of the frequency of the light beam in each beam arm, or twice the Doppler shift in the light beam in one beam arm, is created. The resulting signal in the recombined output light beam is given by a Doppler shift proportional to four times the differential velocity of the two test masses 22 and 24. This factor of four is the same factor of four increase in signal arrived at using the above description of optical path length difference in the two beam arms.

The practical benefit of the improved resolution available from the amplification factor of four is that the test mass 22 need only freefall a reduced distance to achieve adequate resolution for counting the fringes, compared to a greater freefall distance required with a lower amplification factor. A gravimeter with the higher amplification factor of four can be made smaller and more compact than a gravimeter having a lower amplification factor.

The previous discussion of functionality of the gravimeter 20 is that the upper test mass 22 freefalls while the lower test mass 24 is positioned stationarily by the long period isolation device 25. The situation could be reversed by allowing the lower test mass 24 to freefall while the upper test mass 22 is positioned stationarily by a long period isolation device 25. The same beneficial improvements result from this reversed situation, although the positive and negative values of the changes in optical path lengths of the beam arms 32 and 34 would be reversed in the mathematical derivations described above.

Many other advantages and improvements will become apparent upon fully appreciating the many aspects of the present invention. Presently preferred embodiments of the present invention and many of its improvements have been described with a degree of particularity. This description is preferred examples of implementing the invention, and is not necessarily intended to limit the scope of the invention. The scope of the invention is defined by the scope of the following claims.

What is claimed:

1. A gravimeter for measuring a value of gravity, comprising:
   a first test mass which is released for freefall solely influenced by the gravity whose value is measured;
   a second test mass connected to a long period isolation device which inertially stabilizes and isolates the second mass against long period disturbances;
   a source of first and second light beams which have the same initial frequency and a predetermined initial phase relationship; and
   an arrangement of optical elements which conduct the first and second light beams through first and second different beam arms respectively, the first beam arm directing the first light beam to impinge upon and reflect from both first and second test masses during freefall of the first test mass, the second beam arm directing the second light beam to impinge upon and reflect from both first and second test masses during freefall of the first test mass; and wherein:
   an interferometric combination of the first and second light beams delivered from the first and second beam arms after impingement upon and reflection from the test masses determines the value of gravity.

2. A gravimeter as defined in claim 1, wherein:
   the interferometric combination of the first and second light beams yields a number of fringes which define the freefall of the first test mass.

3. A gravimeter as defined in claim 2, further comprising:
   a processor responsive to the freefall of the first test mass to measure a time of freefall of the first test mass; and wherein:
   the processor counts the number of fringes occurring during the time of freefall of the first test mass; and
   the processor derives the value of gravity from the number of fringes counted and the time of freefall.

4. A gravimeter as defined in claim 1, wherein:
   each test mass has a first reflective surface which is oriented in the same direction as the direction of freefall of the first test mass, and each test mass has a second reflective surface which is oriented in the opposite direction of freefall of the first test mass;
   the arrangement of optical elements orients the first beam arm to impinge the first light beam upon and reflect the first light beam from the first reflective surface of one test mass and the second reflective surface of the other test mass; and
   the arrangement of optical elements orients the second beam arm to impinge the second light beam upon and reflect the second light beam from the second reflective surface of the one test mass and the first reflective surface of the other test mass.

5. A gravimeter as defined in claim 1, wherein:
   each beam arm has an optical path length through which the light beam traverses;
   the arrangement of optical elements creates equal and opposite changes in the respective optical path lengths of the first and second beam arms arising from freefall of the first test mass; and
   the arrangement of optical elements creates equal changes in the respective optical path lengths from external disturbances which adversely affect one or both of the first and second test masses during freefall of the first test mass.

6. A gravimeter as defined in claim 5, wherein:
   the arrangement of optical elements establishes equality in the optical path lengths of the first and second beam arms at one predetermined point in the freefall of the first test mass; and
   the arrangement of optical elements causes the optical path lengths of the first and second beam arms to deviate equally and oppositely from the equality in the optical path lengths at the one point during freefall of the first test mass.

7. A gravimeter as defined in claim 6, wherein:
   the arrangement of optical elements includes at least one optical path length adjusting element in one beam arm which is operative to adjust the optical path length of the one beam arm to equal the optical path length of the other beam arm at the one predetermined point.

8. A gravimeter as defined in claim 1, further comprising:
   the arrangement of optical elements orients the first and second beam arms in parallel relation with one another.

9. A gravimeter as defined in claim 8, wherein:
   the arrangement of optical elements further orients the first and second beam arms parallel to the path of freefall of the first test mass.

10. A gravimeter as defined in claim 1, wherein the source of the first and second light beams comprises:
    a source of a constant frequency input light beam; and
    a beam splitter which receives the input light beam and optically splits the input light beam into the first and second light beams and respectively directs the first and second light beams into the first and second beam arms.

11. A gravimeter as defined in claim 10, further comprising:
    a beam combiner which receives the first and second light beams from the first and second beam arms after the light beams have impinged upon and reflected from both first and second test masses, the beam splitter interferometrically combining the first and second light beams into a single output light beam which contains a number of fringes that describe the value of gravity acting upon the first test mass during freefall.

12. A gravimeter as defined in claim 11, wherein the arrangement of optical elements includes the beam splitter and the beam combiner.

13. A gravimeter as defined in claim 1, wherein:
the interferometric combination of the first and second the light beams yields more than two fringes for each wavelength of distance that the first test mass moves relative to the second test mass during freefall, the wavelength established by the initial frequency of the first and second light beams directed into the first and second beam arms.

14. A method of measuring a value of gravity, comprising;
freefalling a first test mass solely influenced by the gravity whose value is measured;
inertially stabilizing a second test mass and isolating the second test mass from long period external disturbances;
directing a first light beam having an initial predetermined frequency in a first beam arm to impinge upon and reflect from both first and second test masses during freefall of the first test mass;
directing a second light beam having the same initial predetermined frequency and a fixed phase relationship with the first light beam in a second beam arm to impinge upon and reflect from both first and second test masses during freefall of the first test mass;
creating fringes by interferometrically combining the first and second light beams from the first and second beam arms after the first and second light beams have impinged upon and reflected from both test masses during freefall of the first test mass; and
determining the value of gravity from the fringes created.

15. A method as defined in claim 14, further comprising:
orienting the first beam arm to impinge the first light beam upon and reflect the first light beam from a first reflective surface of one test mass which is oriented in the same direction as the direction of freefall of the first test mass and from a second reflective surface of the other test mass which is oriented in the direction opposite from freefall of the first test mass; and
orienting the second beam arm to impinge the second light beam upon and reflect the second light beam from a first reflective surface of the other test mass which is oriented in the same direction as the direction of freefall of the first test mass and from a second reflective surface of the one test mass which is oriented in the direction opposite from freefall of the first test mass.

16. A method as defined in claim 14, further comprising:
constituting each of the first and second beam arms to have initially equal optical path lengths at one point in the freefall of the first test mass; and
creating equal changes in the respective optical path lengths of the first and second beam arms during freefall of the first test mass.

17. A method as defined in claim 16, further comprising:
creating opposite changes in the respective optical path lengths of the first and second beam arms during freefall of the first test mass.

18. A method as defined in claim 16, further comprising:
measuring the gravity value during the presence of external disturbances;
equally changing the optical path lengths of the first and second beam arms in response to movement of the first and second test masses caused by the external disturbances; and
canceling effects of the equal changes in optical path lengths resulting from the external disturbances by interferometrically combining the first and second light beams after the first and second light beams have impinged upon and reflected from both first and second test masses during freefall of the first test mass.

19. A method as defined in claim 18, further comprising:
measuring the gravity value during the presence of external disturbances which cause the first test mass to rotate during freefall; and
equally changing the optical path lengths of the first and second beam arms in response to rotation of the first test mass during freefall.

20. A method as defined in claim 16, further comprising:
rotating the first test mass during freefall; and
equally changing the optical path lengths of the first and second beam arms arising during rotation of the first test mass during freefall.

21. A method as defined in claim 14, further comprising:
orienting the first and second beam arms parallel to one another; and
freefalling the first test mass parallel to the first and second beam arms.

22. A method as defined in claim 14, further comprising:
creating more than two fringes for each wavelength of distance at the predetermined frequency that the first test mass moves during freefall relative to the second test mass by the interferometric combination of the first and second light beams.

* * * * *